(12) United States Patent
Kandepu et al.

(10) Patent No.: US 12,093,542 B2
(45) Date of Patent: Sep. 17, 2024

(54) SCALED ZERO-TOUCH OPERATING SYSTEM PROVISIONING ON TARGETED STORAGE

(71) Applicant: Dell Products L.P., Round Rock, TX (US)

(72) Inventors: Anusha Kandepu, Bangalore (IN); Usha Devulapalli, Nalgonda (IN); Hemantha Reddy Beecherla, Khajipet (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/812,861

(22) Filed: Jul. 15, 2022

(65) Prior Publication Data

US 2024/0020034 A1 Jan. 18, 2024

(51) Int. Cl.
*G06F 3/06* (2006.01)

(52) U.S. Cl.
CPC .......... *G06F 3/0632* (2013.01); *G06F 3/0604* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 2010/0228889 A1* | 9/2010 | Uehara | G06F 9/4406 713/2 |
| 2014/0157255 A1* | 6/2014 | Chan | G06F 8/61 717/177 |
| 2017/0147361 A1* | 5/2017 | Kirvan | G06F 9/44505 |
| 2018/0329647 A1* | 11/2018 | Dai | G06F 3/0647 |
| 2021/0263677 A1* | 8/2021 | Patel | G06F 9/5016 |
| 2023/0229481 A1* | 7/2023 | Warkentin | G06F 8/61 718/1 |

* cited by examiner

*Primary Examiner* — Charles J Choi
(74) *Attorney, Agent, or Firm* — Amin, Turocy & Watson, LLP

(57) ABSTRACT

A system can determine a priority order of storage devices for installation of an operating system on targeted storage. The system can further communicate with a target server to determine a group of storage devices accessible by the target server. The system can further identify a storage device of the group of storage devices that has a highest priority for operating system installation. The system can further determine a unique identifier of the storage device. The system can further install the operating system on the storage device using the unique identifier.

20 Claims, 8 Drawing Sheets

SCALED ZERO-TOUCH OPERATING SYSTEM PROVISIONING ON TARGETED STORAGE

BACKGROUND

An operating system can generally be installed on a computer, and provide computer resources to programs that run on the operating system. In some examples where there are multiple computers, an operating system can be installed on each computer.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can determine a priority order of storage devices for installation of an operating system on targeted storage. The system can further communicate with a target server to determine a group of storage devices accessible by the target server. The system can further identify a storage device of the group of storage devices that has a highest priority for operating system installation. The system can further determine a unique identifier of the storage device. The system can further install the operating system on the storage device using the unique identifier.

An example method can comprise determining, by a system comprising a processor, a priority order of storage devices for installing an operating system on a computing device. The method can further comprise determining, by the system, a group of storage devices available to the computing device. The method can further comprise identifying, by the system, a storage device of the group of storage devices that has a highest priority for operating system installation. The method can further comprise determining, by the system, a unique identifier of the storage device. The method can further comprise installing, by the system, the operating system on the storage device using the unique identifier.

An example non-transitory computer-readable medium can comprise instructions that, in response to execution, cause a system comprising a processor to perform operations. These operations can comprise determining a priority order of storage devices usable to install an operating system on a computing device. The operations can further comprise identifying a storage device of a group of storage devices possessed by the computing device that has a highest priority for operating system installation. The operations can further comprise determining a unique identifier of the storage device. The operations can further comprise installing the operating system on the storage device using the unique identifier.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
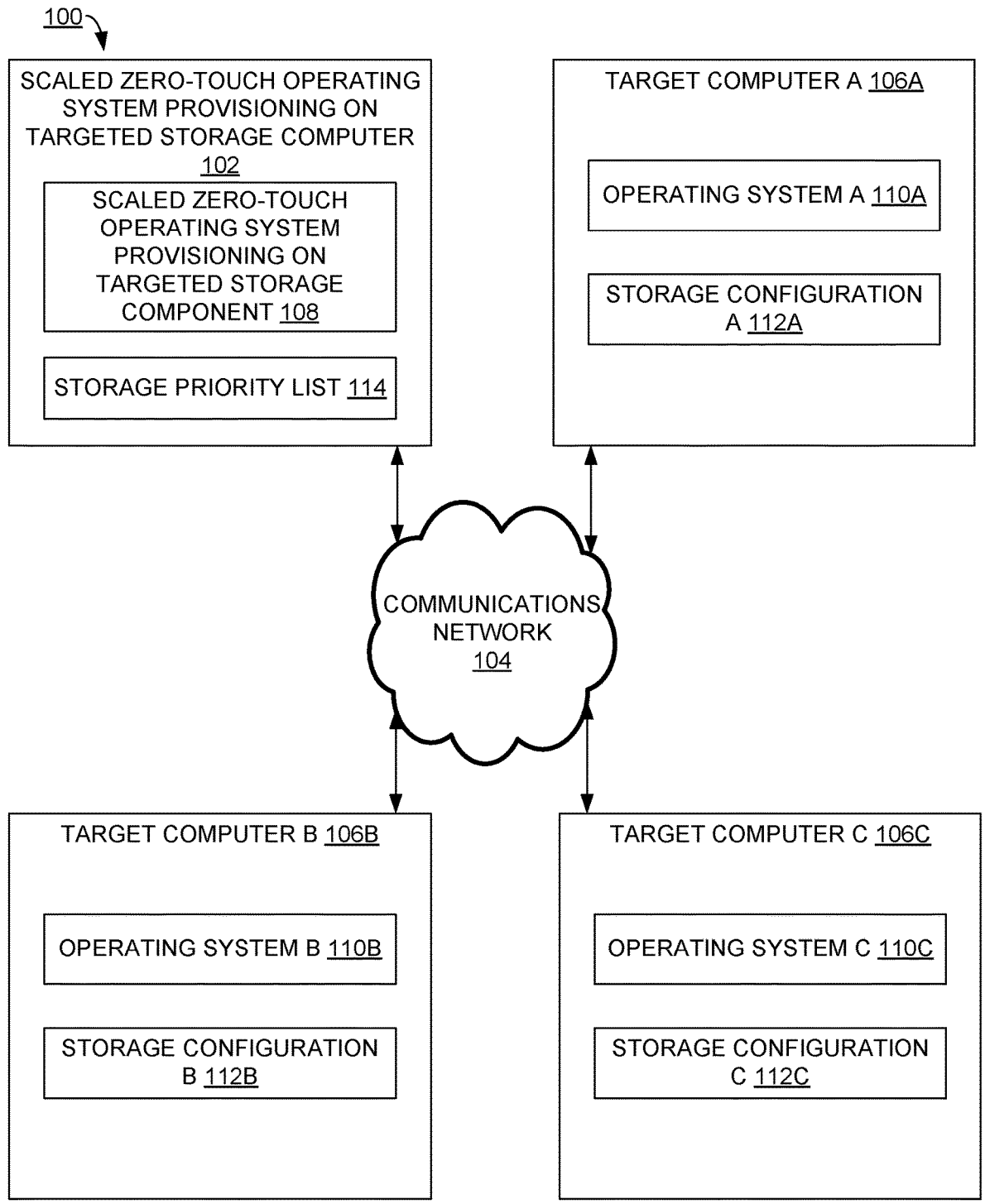
FIG. 1 illustrates an example system architecture that can facilitate scaled zero-touch operating system provisioning on targeted storage, in accordance with an embodiment of this disclosure.

A telecom/enterprise infrastructure environment can be distributed, with a wide variety of server models, where these servers can have a wide variety of storage configurations. Examples of these storage configurations can include Non-Volatile Memory Express (NVMe) storage, Host Bus Adapter (HBA) storage, flash storage coupled to a peripheral component interconnect express (PCIe) card with hardware Redundant Array of Inexpensive Disks (RAID) storage, Secure Digital (SD) based-storage, and RAID storage.

In a scaled environment, there can be a problem associated with identifying a storage layout for a user so that certain storage can be dedicated for operating system (OS) installation, and other certain storage can be dedicated for infrastructure used to manage another storage configuration. That is, it can be challenging to go to each server at remote edge locations and choose the targeted storage for operating system installation. For installing an operating system, it can be that a boot device is passed.

Prior approaches to zero-touch operating system provisioning can generally use "first disk" as an option to use as the installation device. With a "first disk" approach, the operating system is installed on the first available disk on all the servers. A problem with this approach is that it does not provide flexibility to users to select a specific storage type during operating system installation. Prior approaches can lack a functionality to perform an operating system deployment on a specified storage type in a zero-touch manner, which does not need a user to configure storage device details on each server.

A solution to these problems according to the present techniques can involve using a storage-type priority order to pick a storage device for operating system installation.

In a scenario where an operating system installation disk is randomly selected based on a "first disk" option, the present techniques can be implemented to dedicate which disk is used for operating system installation. In this manner, the rest of the storage can be maintained in a preferred configuration for another storage configuration. A user can manage an operating system installation on a scaled environment with distinct storage configurations through a same priority order.

In an environment where storage on different servers can belong to different storage types, the present techniques can be implemented to manage operating system installation seamlessly, without user intervention for installation device input. The present techniques can function to pick an available storage device after scanning through a given priority order, and skip the types of storage in the priority order that are not present on the server. This same priority order can be used to manage operating systems on scaled environments in a zero-touch manner.

For example, a priority order can be [NVME, HBA, RAID, FLASH, SD] (where here, "FLASH" indicates flash storage coupled to a PCIe card with hardware RAID storage). In this priority order, NVMe storage is identified as the first storage type in priority. So, if a server has NVMe storage, that NVMe storage can be picked for installing the operating system. If the server does not have NVMe storage, then the next storage type on the priority order can be picked for this installation. In this manner, a user can have flexibility to target operating system installation on certain storage types. With this approach, from a centralized location, operating system installation can be performed on all remote edge servers in a zero-touch manner based on a storage device type priority order.

A scaled zero-touch provisioning (ZTP) OS install service can find details of targeted disks that are available, based on a given storage type order. The service can get the details of all the storage devices from a baseboard management controller (BMC), and pick the disk of the mentioned type in the priority order. Where a disk of a particular type is not found, the service can move to the next type in the priority order. If a disk of this next type is found, the service can determine the unique identifier details of the disk that can be used by the operating system to identify the target disk.

Based on the storage type, the unique identifiers can vary. For example, with RAID and HBA disks, a serial-attached small computer system interface (SCSI) (SAS) address and target number can be used. For NVMe storage, the unique identifier can be the disk's serial number. For flash storage coupled to a PCIe card with hardware RAID storage, the unique identifier can be the disk name and/or disk type. For SD cards, the device type can be used as the unique identifier. In this manner, all types of storage can have unique identifiers that allow the operating system to identify the storage device, which can be facilitated to the ZTP OS install service. Where the storage device is identified, a kickstart configuration (which can generally comprise a set of computer commands that can be run by a target computer on which an operating system can be used to find a device name with a certain set of commands.

A kickstart configuration can comprise a script that identifies to an installer how to install and configure an operating system The installation script can provide a % pre section (a pre-installation section), which can run before the OS installation. Here, specific scripts can be run, and certain files can be generated for the kickstart to use during installation. A set of commands can be added to the % pre section to derive a device name to include in the installation. An example flow can be as follows.

Consider an example where a user desires to install an operating system on all servers in its environment through a single operating system configuration, where the storage type priority order is [NVME, HBA, RAID, FLASH, SD].

In a distributed architecture, servers can comprise a wide variety of storage configurations. A central site can have NVMe, RAID, FLASH and HBA storage. Then, different cell sites can have different storage configurations. In this example, operating system installation in an unattended fashion on targeted storage can be possible according to the present techniques.

Unique identifiers for the disk can be determined from the service. In some examples, with the % pre section in the kickstart, the device name can be derived, and an installation command, "install--disk=$DEVICENAME" can be written into a /tmp/sks.cfg file. This file can be included in the kickstart and used for the installation.

The following is an example of a kickstart configuration, which can be a type of a pre-installation script used with certain operating systems. In some examples, different types of pre-installation scripts (e.g., AutoYaST, preseed) can be used with different types of operating systems. This example kickstart configuration can be a common kickstart configuration that can handle all types of storage, and on a particular operating system type install.

```
# Specifies another installation script to parse
%include /tmp/sks.cfg
# Create a script to run before kickstart configuration is evaluated, this is used to generate
files for the kickstart file to include
%pre -- interpreter=busybox
# Retrieving the Device UID for all types of Volumes supported and using it for partitioning
and installing UI PICKFIRSTVOLUME={ {.PickFirst Volume} }
SASADDRESS={ {.SASAddress } }
TARGET={ { Target} }
TARGET=`expr $TARGET % 128`
SERIALNUMBER={ {.SerialNumber} }
DEVICETYPE={ {.DeviceType } }
DEVICENAME=""
if [[ $DEVICETYPE == "NVMe" ]]; then
    NVMeDevices=$(localcli NVMe device list | awk '{print $1}')
    for NVMeDevice in $NVMeDevices
    do
        if [[ $(localcli NVMe device get -A $NVMeDevice | grep -c -i
$SERIALNUMBER) == 1 ]]; then
```

-continued

```
        DEVICENAME=$(localcli storage core adapter device list | awk '{
    if($1 == "'$NVMeDevice'") print $2}')
        fi
    done
    echo "install -- disk=$DEVICENAME -- overwritevmfs" >> /tmp/sks.cfg
elif [[ $DEVICETYPE == "raid" ]]; then
    if [[ $PICKFIRSTVOLUME == "Yes" ]]; then
        DEVICENAME-$(esxcfg-mpath -L | awk '{ if($11 == "'$SASADDRESS'")
        print $3 }' | head -1 | tail -1 | awk '{print $1 }') echo "install -- disk=$DEVICENAME --
        overwritevmfs" >> /tmp/sks.cfg
    else
        DEVICENAME=$(esxcfg-mpath -L | awk '{ if($11 == "'$SASADDRESS'"
        && $6 == "'$TARGET'") print $3}')
        echo "install -- disk=$DEVICENAME -- overwritevmfs" >> /tmp/sks.cfg
    fi
elif [[ $DEVICETYPE == "hba" ]]; then
    DEVICENAME=$(esxcfg-mpath -L | awk '{ if($11 == "$SASADDRESS" && $6
    == "'$TARGET'") print $3 }')
    echo "install -- disk=$DEVICENAME --overwritevmfs" >> /tmp/sks.cfg
elif [[ $DEVICETYPE == "usb" ]]; then
    echo "install -- ignoressd -- firstdisk=usb --overwritevmfs --novmfsondisk" >>
    /tmp/sks.cfg
elif [[ $DEVICETYPE == "flash" ]]; then
    DEVICENAME=$(esxcfg-mpath -L | awk '{ if($3 ~ "<<name of the device>>") print
    $3}' | awk 'NR==1')
    echo "install --disk=$DEVICENAME - overwritevmfs" >> /tmp/sks.cfg
fi
```

With the above configuration and the inputs coming from a scaled ZTP OS install service, operating system installation can be targeted to a specific disk.

Example Architectures

FIG. 1 illustrates an example system architecture 100 that can facilitate scaled zero-touch operating system provisioning on targeted storage, in accordance with an embodiment of this disclosure.

System architecture 100 comprises scaled zero-touch operating system provisioning on targeted storage computer 102, communications network 104, target computer A 106A, target computer B 106B, and target computer C 106C. In turn, scaled zero-touch operating system provisioning on targeted storage computer 102 comprises scaled zero-touch operating system provisioning on targeted storage component 108 and storage priority list 114; target computer A 106A comprises operating system A 110A and storage configuration A 112A; target computer B 106B comprises operating system B 110B and storage configuration B 112B; and target computer C 106C comprises operating system C 110C and storage configuration C 112C.

Figure 8:
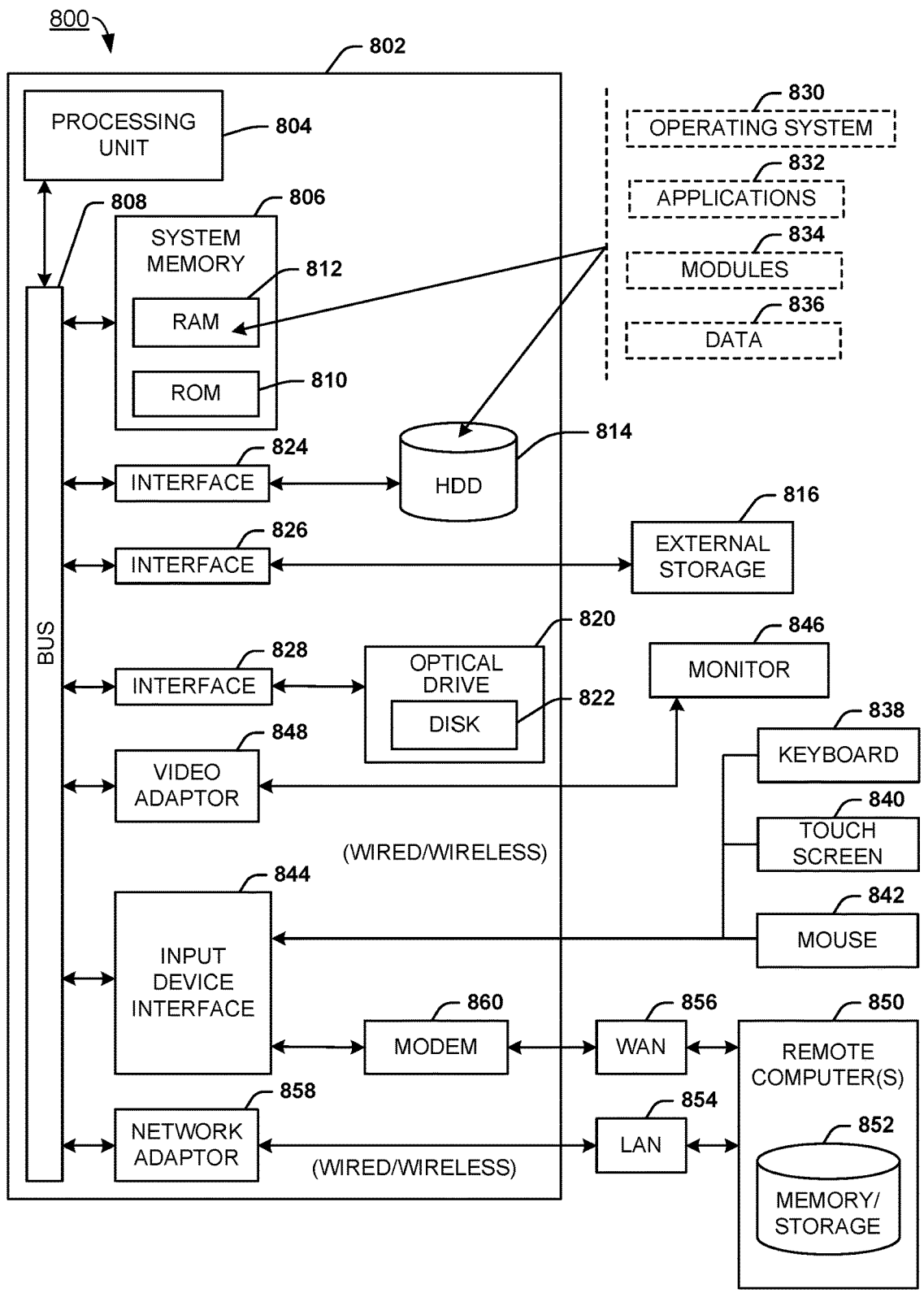
FIG. 8 illustrates an example block diagram of a computer operable to execute an embodiment of this disclosure.

Each of scaled zero-touch operating system provisioning on targeted storage computer 102, target computer A 106A, target computer B 106B, and/or target computer C 106C can be implemented with part(s) of computing environment 800 of FIG. 8.

Each of target computer A 106A, target computer B 106B, and/or target computer C 106C can comprise a computer upon which scaled zero-touch operating system provisioning on targeted storage component 108 can install a new operating system (which can sometimes be referred to as a copy, or an instance, of an operating system). Each of target computer A 106A, target computer B 106B, and/or target computer C 106C can have a different storage configuration (which can generally comprise which types of storage a computer possesses). For example, storage configuration A 112A can comprise NVMe and RAID storage, and storage configuration B 112B can comprise NVMe and flash storage coupled to a PCIe card with hardware RAID storage.

As part of installing an operating system, for each computer, scaled zero-touch operating system provisioning on targeted storage component 108 can identify which storage of that computer's respective storage configuration has a highest priority according to storage priority list 114. Scaled zero-touch operating system provisioning on targeted storage component 108 can then install the operating system on that identified storage for that computer.

In some examples, scaled zero-touch operating system provisioning on targeted storage component 108 can implement part(s) of the process flows of FIGS. 4-7 to implement scaled zero-touch operating system provisioning on targeted storage.

It can be appreciated that system architecture 100 is one example system architecture for scaled zero-touch operating system provisioning on targeted storage, and that there can be other system architectures that facilitate scaled zero-touch operating system provisioning on targeted storage.

Figure 2:
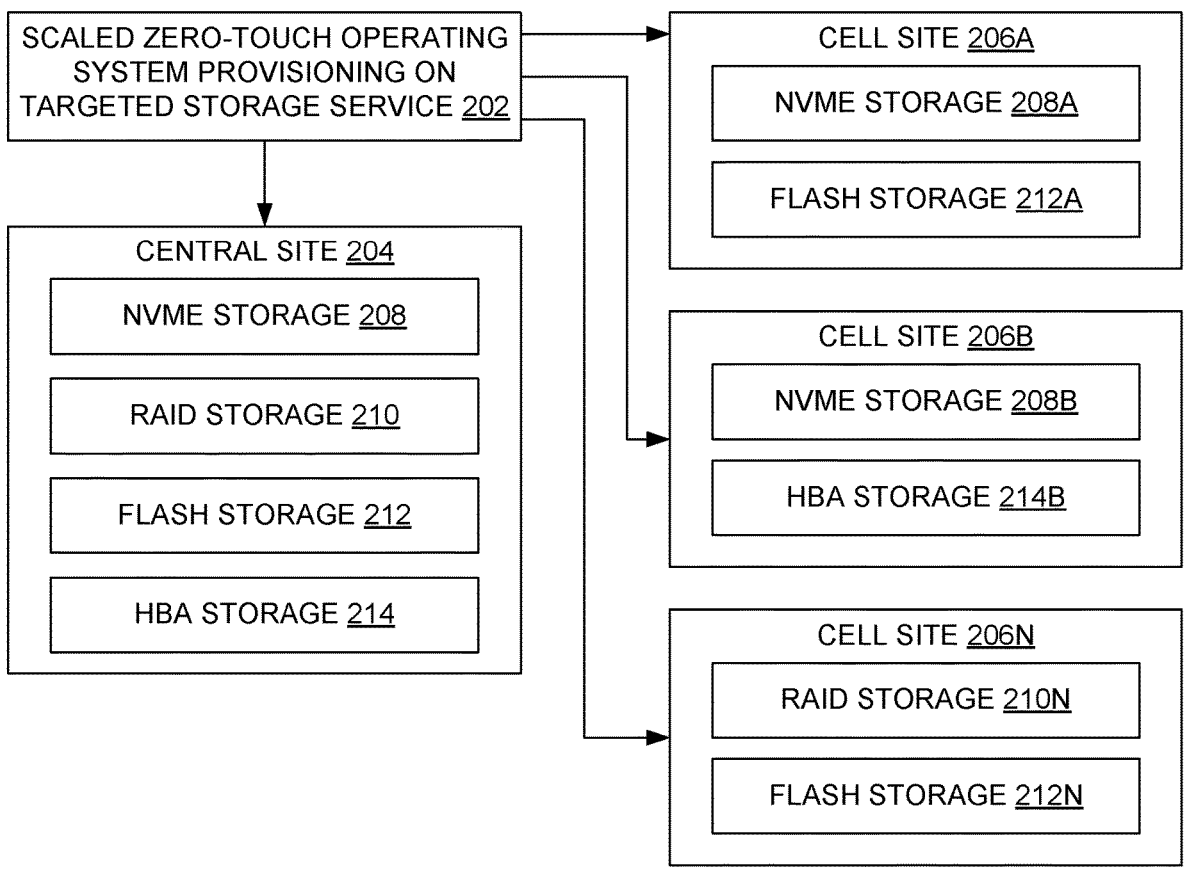
FIG. 2 illustrates another example system architecture that can facilitate scaled zero-touch operating system provisioning on targeted storage, in accordance with an embodiment of this disclosure.

FIG. 2 illustrates another example system architecture 200 that can facilitate scaled zero-touch operating system provisioning on targeted storage, in accordance with an embodiment of this disclosure. In some examples, part(s) of system architecture 200 can be used to implement part(s) of system architecture 100 of FIG. 1 to facilitate scaled zero-touch operating system provisioning on targeted storage.

System architecture 200 comprises scaled zero-touch operating system provisioning on targeted storage service 202, central site 204, cell site A 206A, cell site B 206B, and cell site N 206N. In turn, central site 204 comprises NVMe storage 208, RAID storage 210, flash storage 212 (which can be flash storage coupled to a PCIe card with hardware RAID storage), and HBA storage 214. Cell site A 206A comprises NVMe storage 208A and flash storage 212A. Cell site B 206B comprises NVMe storage 208B and HBA storage 214B. Cell site N 206N comprises RAID storage 210N and flash storage 212N.

Central site 204, cell site A 206A, cell site B 206B, and cell site N 206N can combine to form a geographically distributed set of computers upon which the present techniques can be applied for scaled zero-touch operating system provisioning on targeted storage.

Scaled zero-touch operating system provisioning on targeted storage service 202 can be similar to scaled zero-touch operating system provisioning on targeted storage component 108 of FIG. 1. Each of central site 204, cell site 206A, cell site 206B, and cell site 206N can be similar to one or more of target computer 106A, target computer 106B, and/or target computer 106C.

In system architecture 200, different computers (e.g., central site 204, cell site 206A, cell site 206B, and cell site 206N) can have different storage configurations. In installing an operating system on each computer, scaled zero-touch operating system provisioning on targeted storage service 202 can utilize a storage priority list to determine which type of storage to install an operating system on for each computer.

Take for example a scenario where the storage priority list is [NVME, HBA, RAID, FLASH, SD]. While central site 204, cell site A 206A, and cell site B 206B have different storage configurations, they each have NVMe storage. Since the storage priority list indicates that NVMe storage has the highest priority for installing an operating system, scaled zero-touch operating system provisioning on targeted storage service 202 can install an operating system on each of these computers' respective NVMe storage.

Then, cell site N 206N lacks NVMe storage. Cell site N 206N also lacks HBA storage, which has the second priority in the storage priority list. Cell site N 206N does have RAID storage, which is the third priority in the storage priority list, so scaled zero-touch operating system provisioning on targeted storage service 202 can install an operating system on RAID storage for cell site N 206N.

Figure 3:
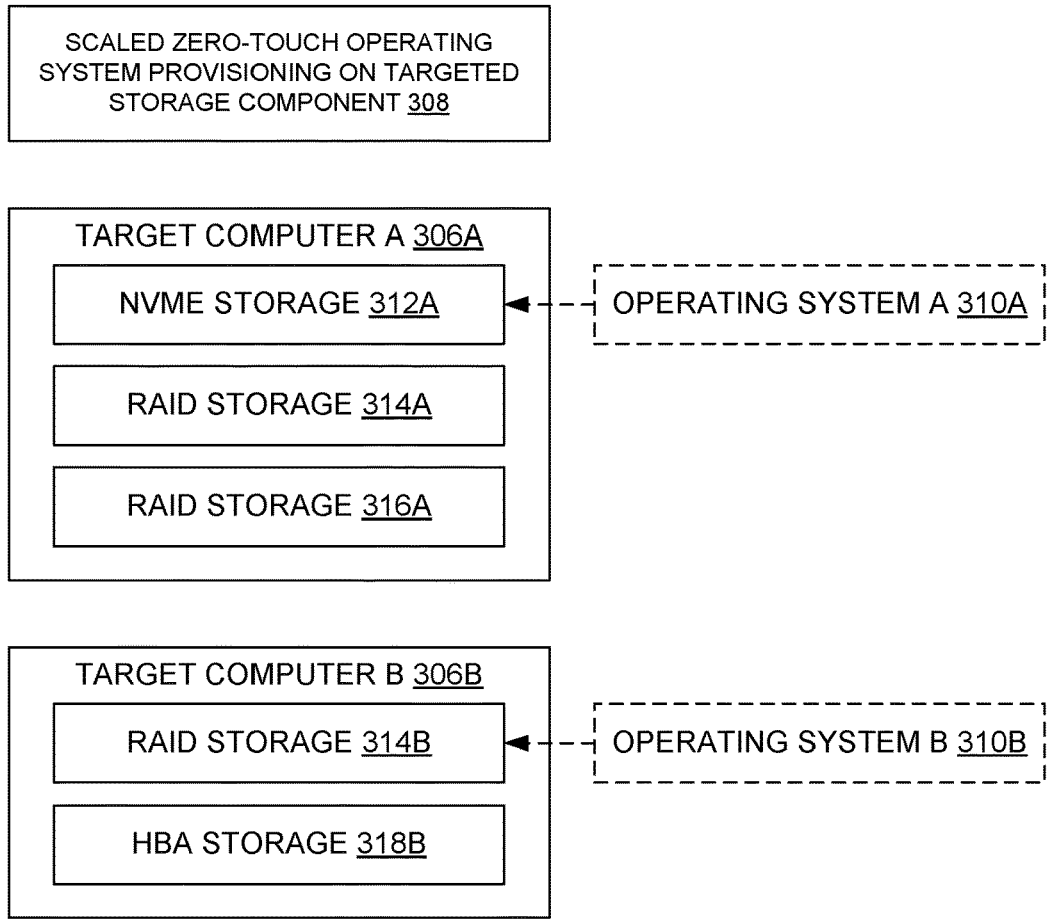
FIG. 3 illustrates another example system architecture that can facilitate scaled zero-touch operating system provisioning on targeted storage, in accordance with an embodiment of this disclosure.

FIG. 3 illustrates another example system architecture 300 that can facilitate scaled zero-touch operating system provisioning on targeted storage, in accordance with an embodiment of this disclosure. In some examples, part(s) of system architecture 300 can be used to implement part(s) of system architecture 100 of FIG. 1 to facilitate scaled zero-touch operating system provisioning on targeted storage.

System architecture 300 comprises scaled zero-touch operating system provisioning on targeted storage component 308, target computer A 306A, and target computer B 306B. In turn, target computer 306A comprises operating system A 310A, NVMe storage 312A, RAID storage 314A, and flash storage 316A (which can be flash storage coupled to a PCIe card with hardware RAID storage). Target computer 306B comprises operating system B 310B, RAID storage 314B and HBA storage 318B.

In some examples, scaled zero-touch operating system provisioning on targeted storage component 308 can be similar to scaled zero-touch operating system provisioning on targeted storage component 108 of FIG. 1; target computer A 306A can be similar to target computer A 106A; and target computer B 306B can be similar to target computer B 106B.

Each of operating system A 310A and operating system B 310B can comprise an operating system installed by scaled zero-touch operating system provisioning on targeted storage component 308. Continuing with an example where a storage priority list is [NVME, HBA, RAID, FLASH, SD], scaled zero-touch operating system provisioning on targeted storage component 308 can install operating system A 310A on NVMe storage 312A for target computer A 306A, and can install operating system B 310B on RAID storage 314B for target computer B 306B.

Figure 4:
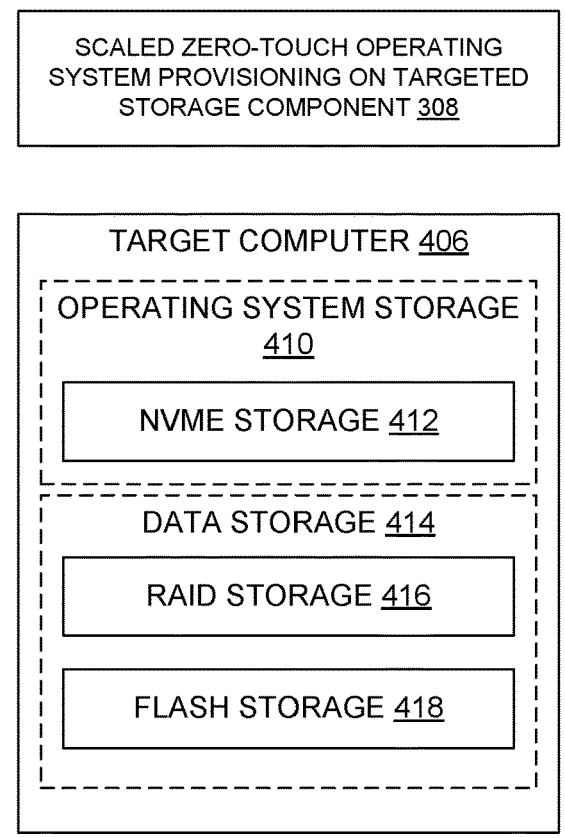
FIG. 4 illustrates another example system architecture that can facilitate scaled zero-touch operating system provisioning on targeted storage, in accordance with an embodiment of this disclosure.

FIG. 4 illustrates another example system architecture 400 that can facilitate scaled zero-touch operating system provisioning on targeted storage, in accordance with an embodiment of this disclosure. In some examples, part(s) of system architecture 400 can be used to implement part(s) of system architecture 100 of FIG. 1 to facilitate scaled zero-touch operating system provisioning on targeted storage.

System architecture 400 comprises scaled zero-touch operating system provisioning on targeted storage component 408, and target computer 406. Target computer 406 comprises operating system storage 410 (which, in turn, comprises NVMe storage 412) and data storage 414 (which, in turn, comprises RAID storage 416, and flash storage 418—which can be flash storage coupled to a PCIe card with hardware RAID storage).

In some examples, scaled zero-touch operating system provisioning on targeted storage component 408 can be similar to scaled zero-touch operating system provisioning on targeted storage component 108 of FIG. 1; and target computer 406 can be similar to target computer A 106A, target computer B 106B, and/or target computer C 106C.

Operating system storage 410 can comprise a portion of the storage of target computer 406 that is dedicated for operating system installation, and data storage 414 can comprise a portion of the storage of target computer 406 that is dedicated for data storage (such as for infrastructure used to maintain another storage configuration). By using a storage priority list, scaled zero-touch operating system provisioning on targeted storage component 408 can direct where in target computer 406 an operating system is installed, to preserve the separation between operating system storage 410 and data storage 414.

Example Process Flows

Figure 5:
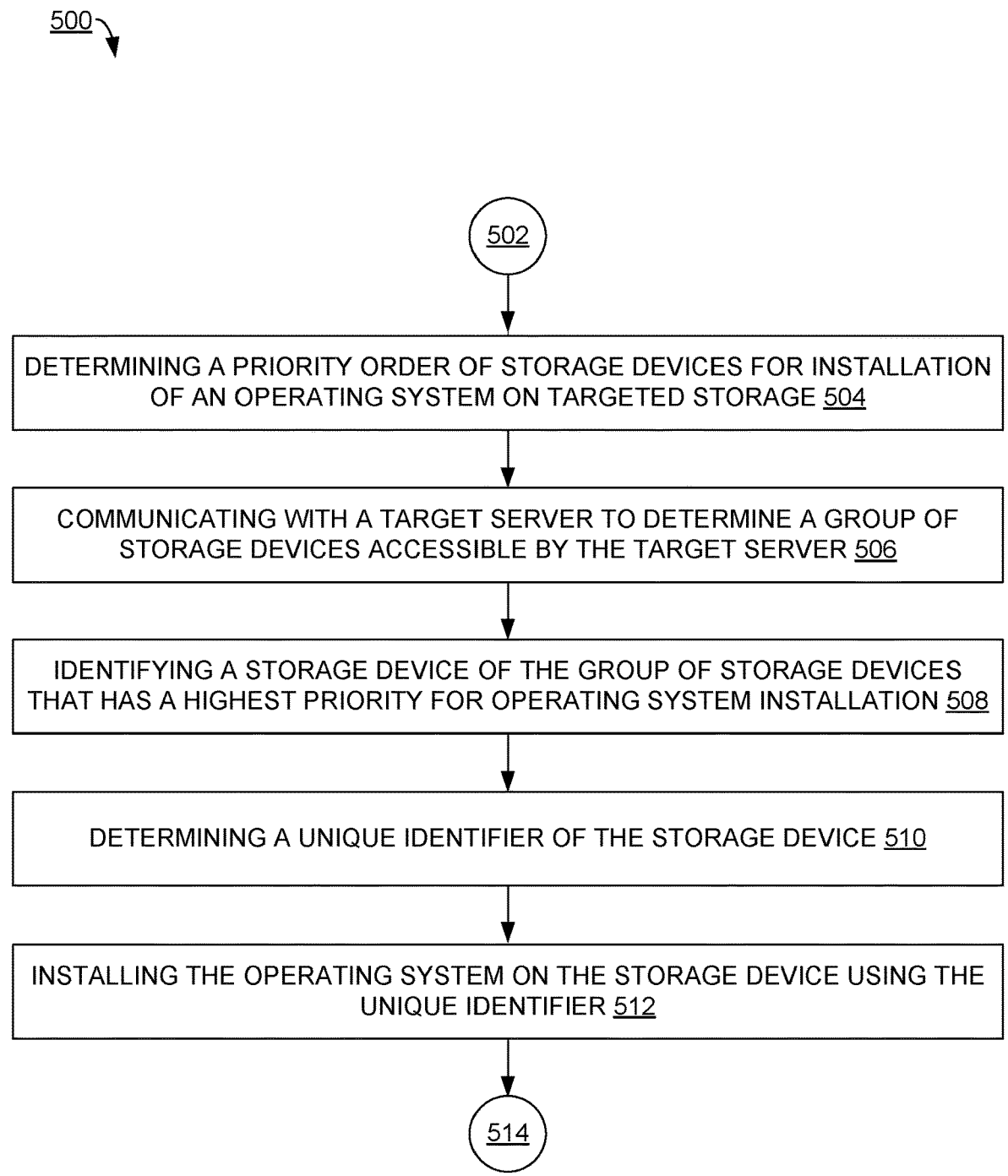
FIG. 5 illustrates an example process flow that can facilitate scaled zero-touch operating system provisioning on targeted storage, in accordance with an embodiment of this disclosure.

FIG. 5 illustrates an example process flow 500 that can facilitate scaled zero-touch operating system provisioning on targeted storage, in accordance with an embodiment of this disclosure. In some examples, one or more embodiments of process flow 500 can be implemented by scaled zero-touch operating system provisioning on targeted storage component 108 of FIG. 1, or computing environment 800 of FIG. 8.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 600 of FIG. 6, and/or process flow 700 of FIG. 7.

Process flow 500 begins with 502, and moves to operation 504.

Operation 504 depicts determining a priority order of storage devices for installation of an operating system on targeted storage. In some examples, an administrator can provide user input of the priority order, and the priority order can be similar to storage priority list 114 of FIG. 1.

After operation 504, process flow 500 moves to operation 506.

Operation 506 depicts communicating with a target server to determine a group of storage devices accessible by the target server. In some examples, scaled zero-touch provisioning on targeted storage component 108 of FIG. 1 can communicate with target computer A 106A to determine what types of storage devices it has (e.g., storage configuration A 112A).

After operation 506, process flow 500 moves to operation 508.

Operation 508 depicts identifying a storage device of the group of storage devices that has a highest priority for operating system installation. Using the example of FIG. 3, this can be where the priority order of storage devices identifies NVMe storage as the top priority, and target computer A 306A has NVMe storage 312A, so it has the highest priority for operating system installation.

After operation 508, process flow 500 moves to operation 510.

Operation 510 depicts determining a unique identifier of the storage device. In some examples, the unique identifier can be fetched from the target system by scaled zero-touch operating system provisioning on targeted storage component 108 of FIG. 1.

In some examples, the storage device comprises host bus adapter storage, and the unique identifier of the storage device comprises a combination of a serial-attached small computer system interface address and a target number.

In some examples, the storage device comprises a redundant array of independent storage, and the unique identifier of the storage device comprises a combination of a serial-attached small computer system interface address and a target number.

In some examples, the storage device comprises non-volatile memory express storage, and the unique identifier of the storage device comprises a serial number of the storage device.

In some examples, the storage device comprises flash storage coupled to a PCIe card with hardware RAID storage, and the unique identifier of the storage device comprises a name or type of a disk of the storage device.

In some examples, the storage device comprises secure digital-based storage, and the unique identifier of the storage device comprises a device type of the storage device.

After operation 510, process flow 500 moves to operation 512.

Operation 512 depicts installing the operating system on the storage device using the unique identifier. Using the example of FIG. 3, operating system 310A is installed on NVMe storage 312A. This can be performed similar to as described with respect to a kickstart script herein.

In some examples, storage devices of the group of storage devices are determined in an order, and wherein the storage device differs from a first-identified storage device in the order as seen by the operating system during installation. That is, in some prior techniques, an operating system is installed on a first storage device presented to the operating system. According to the present techniques, an operating system can be installed on an arbitrary storage device (which can be identified by a priority list).

After operation 512, process flow 500 moves to 514, where process flow 500 ends.

Figure 6:
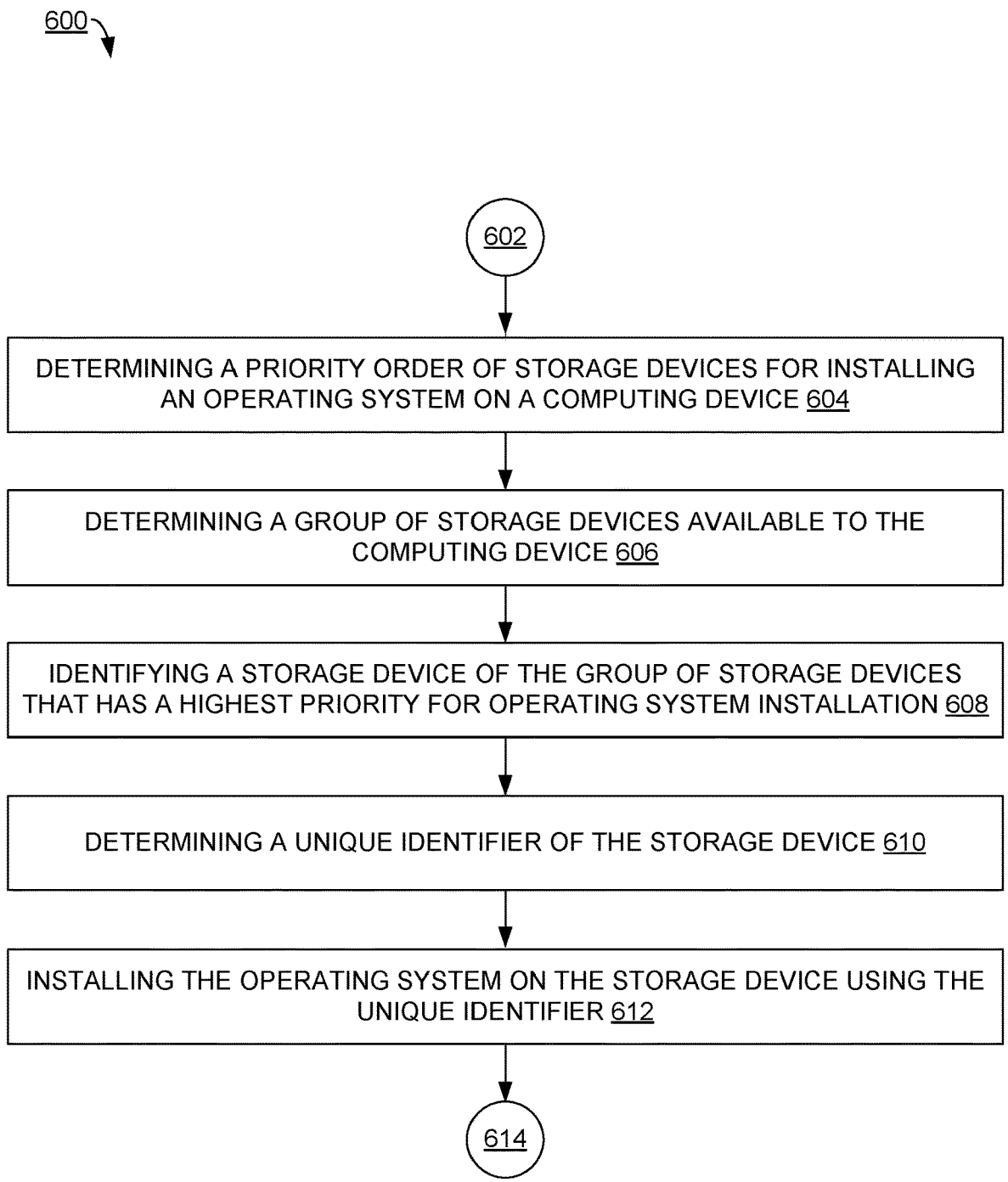
FIG. 6 illustrates another example process flow that can facilitate scaled zero-touch operating system provisioning on targeted storage, in accordance with an embodiment of this disclosure.

FIG. 6 illustrates an example process flow 600 that can facilitate scaled zero-touch operating system provisioning on targeted storage, in accordance with an embodiment of this disclosure. In some examples, one or more embodiments of process flow 600 can be implemented by scaled zero-touch operating system provisioning on targeted storage component 108 of FIG. 1, or computing environment 800 of FIG. 8.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 500 of FIG. 5, and/or process flow 700 of FIG. 7.

Process flow 600 begins with 602, and moves to operation 604.

Operation 604 depicts determining a priority order of storage devices for installing an operating system on a computing device. In some examples, operation 604 can be implemented in a similar manner as operation 504.

In some examples, the priority order is determined for a group of computing devices that comprises the computing device, the priority order is maintained externally from the computing device, and respective operating system installation for respective computing devices of the group of computing devices is performed based on the priority order. That is, prior approaches can lack a functionality to perform an operating system deployment on a specified storage type in a zero-touch manner, where it can be that a user does not need to configure storage device details on each server. Rather, one priority order can be used to specify a boot device for each of multiple computing devices.

In some examples, the priority order of storage devices prioritizes storage devices with better performance for non-operating system data as determined according to the performance criterion. That is, a purpose of setting the priority order can be to install an operating system so as to reserve more performant storage for data.

After operation 604, process flow 600 moves to operation 606.

Operation 606 depicts determining a group of storage devices available to the computing device. In some examples, operation 606 can be implemented in a similar manner as operation 506.

In some examples, operation 606 comprises communicating with a baseboard management controller of the computing device.

After operation 606, process flow 600 moves to operation 608.

Operation 608 depicts identifying a storage device of the group of storage devices that has a highest priority for operating system installation. In some examples, operation 608 can be implemented in a similar manner as operation 508.

In some examples, a first portion of the group of storage devices is dedicated for operating system installation, and a second portion of the group of storage devices is dedicated for infrastructure to maintain a another storage configuration. That is, storage can be utilized similar to as described with respect to system architecture 400 of FIG. 4.

In some examples, the group of storage drives omits a top priority type of storage identified by the priority order of storage devices, and the storage device corresponds to a second priority type of storage identified by the priority order of storage devices. That is, where a top priority order device is not possessed by the computing device, the operating system can be installed on a second-priority (or third, etc.) device. Using an example of a priority order of [NVME, HBA, RAID], this can be where the computing device lacks NVMe storage, and the operating system is installed on HBA storage.

After operation 608, process flow 600 moves to operation 610.

Operation 610 depicts determining a unique identifier of the storage device. In some examples, operation 610 can be implemented in a similar manner as operation 510.

In some examples, the unique identifier of the storage device comprises an identifier used by the operating system to identify the storage device.

After operation 610, process flow 600 moves to operation 612.

Operation 612 depicts installing the operating system on the storage device using the unique identifier. In some examples, operation 612 can be implemented in a similar manner as operation 512.

After operation 612, process flow 600 moves to 614, where process flow 600 ends.

Figure 7:
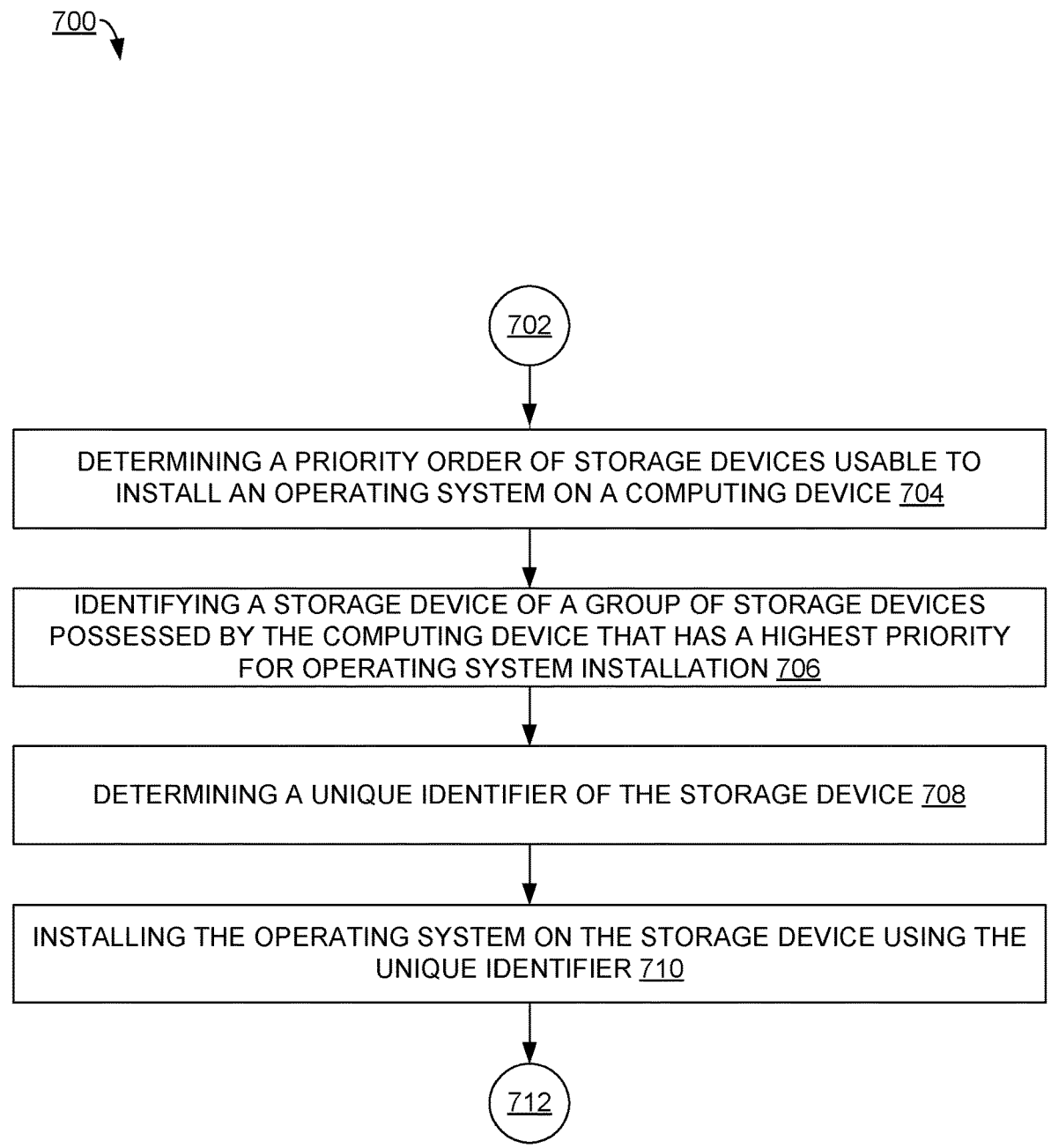
FIG. 7 illustrates another example process flow that can facilitate scaled zero-touch operating system provisioning on targeted storage, in accordance with an embodiment of this disclosure.

FIG. 7 illustrates an example process flow 700 that can facilitate scaled zero-touch operating system provisioning on targeted storage, in accordance with an embodiment of this disclosure. In some examples, one or more embodiments of process flow 700 can be implemented by scaled zero-touch operating system provisioning on targeted storage component 108 of FIG. 1, or computing environment 800 of FIG. 8.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 500 of FIG. 5, and/or process flow 600 of FIG. 6.

Process flow 700 begins with 702, and moves to operation 704.

Operation 704 depicts determining a priority order of storage devices usable to install an operating system on a computing device. In some examples, operation 704 can be implemented in a similar manner as operation 504 of FIG. 5.

After operation 704, process flow 700 moves to operation 706.

Operation 706 depicts identifying a storage device of a group of storage devices possessed by the computing device that has a highest priority for operating system installation. In some examples, operation 706 can be implemented in a similar manner as operation 508 of FIG. 5.

In some examples, a first portion of the group of storage devices is designated for operating system installation in accordance with the priority order, and a second portion of the group of storage devices is configured as part of another storage configuration.

In some examples, the storage device comprises non-volatile memory express storage. In some examples, the storage device comprises secure digital-based storage, host bus adapter storage, a redundant array of independent drives storage, or flash storage coupled to a PCIe card with hardware RAID storage.

After operation 706, process flow 700 moves to operation 708.

Operation 708 depicts determining a unique identifier of the storage device. In some examples, operation 708 can be implemented in a similar manner as operation 510 of FIG. 5.

After operation 708, process flow 700 moves to operation 710.

Operation 710 depicts installing the operating system on the storage device using the unique identifier. In some examples, operation 710 can be implemented in a similar manner as operation 512 of FIG. 5.

In some examples, the computing device is a first computing device, the operating system is installed on a second storage device of a second computing device, and the storage device is of a different storage type than the second storage device. That is, different target servers can have an operating system installed on different storage device types, such as depicted in the example of system architecture 300 of FIG. 3.

In some examples, a group of computing devices comprises the computing device, respective computing devices of the group of computing devices are distributed geographically, respective computing devices of the group of computing devices have respective different storage configurations, and respective operating system installations on the respective computing devices are performed according to the priority order. That is, it can be that the present techniques can be implemented to install operating systems on geographically-dispersed computing devices according to a set storage priority order, so that individual configuration of each computing device for operating system installation can be avoided, or reduced.

After operation 710, process flow 700 moves to 712, where process flow 700 ends.

Example Operating Environment

In order to provide additional context for various embodiments described herein, FIG. 8 and the following discussion are intended to provide a brief, general description of a suitable computing environment 800 in which the various embodiments of the embodiment described herein can be implemented.

For example, parts of computing environment 800 can be used to implement one or more embodiments of scaled zero-touch operating system provisioning on targeted storage computer 102, communications network 104, target computer A 106A, target computer B 106B, and target computer C 106C of FIG. 1.

In some examples, computing environment 800 can implement one or more embodiments of the process flows of FIGS. 4-7 to facilitate scaled zero-touch operating system provisioning on targeted storage.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 8, the example environment 800 for implementing various embodiments described herein includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures can also be employed as the processing unit 804.

The system bus 808 can be any of several types of bus structure that can further interconnect to a memory bus (with or without a memory controller), a peripheral bus, and a local bus using any of a variety of commercially available bus architectures. The system memory 806 includes ROM 810 and RAM 812. A basic input/output system (BIOS) can be stored in a nonvolatile storage such as ROM, erasable programmable read only memory (EPROM), EEPROM, which BIOS contains the basic routines that help to transfer information between elements within the computer 802, such as during startup. The RAM 812 can also include a high-speed RAM such as static RAM for caching data.

The computer 802 further includes an internal hard disk drive (HDD) 814 (e.g., EIDE, SATA), one or more external storage devices 816 (e.g., a magnetic floppy disk drive (FDD) 816, a memory stick or flash drive reader, a memory card reader, etc.) and an optical disk drive 820 (e.g., which can read or write from a CD-ROM disc, a DVD, a BD, etc.). While the internal HDD 814 is illustrated as located within the computer 802, the internal HDD 814 can also be configured for external use in a suitable chassis (not shown). Additionally, while not shown in environment 800, a solid state drive (SSD) could be used in addition to, or in place of, an HDD 814. The HDD 814, external storage device(s) 816 and optical disk drive 820 can be connected to the system bus 808 by an HDD interface 824, an external storage interface 826 and an optical drive interface 828, respectively. The interface 824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 812, including an operating system 830, one or more application programs 832, other program modules 834 and program data 836. All or portions of the operating system, applications, modules, and/or data can also be cached in the RAM 812. The systems and methods described herein can be implemented utilizing various commercially available operating systems or combinations of operating systems.

Computer 802 can optionally comprise emulation technologies. For example, a hypervisor (not shown) or other intermediary can emulate a hardware environment for operating system 830, and the emulated hardware can optionally be different from the hardware illustrated in FIG. 8. In such an embodiment, operating system 830 can comprise one virtual machine (VM) of multiple VMs hosted at computer 802. Furthermore, operating system 830 can provide runtime environments, such as the Java runtime environment or the .NET framework, for applications 832. Runtime environments are consistent execution environments that allow applications 832 to run on any operating system that includes the runtime environment. Similarly, operating system 830 can support containers, and applications 832 can be in the form of containers, which are lightweight, standalone, executable packages of software that include, e.g., code, runtime, system tools, system libraries and settings for an application.

Further, computer 802 can be enabled with a security module, such as a trusted processing module (TPM). For instance, with a TPM, boot components hash next in time boot components, and wait for a match of results to secured values, before loading a next boot component. This process can take place at any layer in the code execution stack of computer 802, e.g., applied at the application execution level or at the operating system (OS) kernel level, thereby enabling security at any level of code execution.

A user can enter commands and information into the computer 802 through one or more wired/wireless input devices, e.g., a keyboard 838, a touch screen 840, and a pointing device, such as a mouse 842. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 804 through an input device interface 844 that can be coupled to the system bus 808, but can be connected by other interfaces, such as a parallel port, an IEEE 894 serial port, a game port, a USB port, an IR interface, a BLUETOOTH® interface, etc.

A monitor 846 or other type of display device can be also connected to the system bus 808 via an interface, such as a video adapter 848. In addition to the monitor 846, a computer typically includes other peripheral output devices (not shown), such as speakers, printers, etc.

The computer 802 can operate in a networked environment using logical connections via wired and/or wireless communications to one or more remote computers, such as a remote computer(s) 850. The remote computer(s) 850 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 852 is illustrated. The logical connections depicted include wired/wireless connectivity to a local area network (LAN) 854 and/or larger networks, e.g., a wide area network (WAN) 856. Such LAN and WAN networking environments are commonplace in offices and companies, and facilitate enterprise-wide computer networks, such as intranets, all of which can connect to a global communications network, e.g., the Internet.

When used in a LAN networking environment, the computer 802 can be connected to the local network 854 through a wired and/or wireless communication network interface or adapter 858. The adapter 858 can facilitate wired or wireless communication to the LAN 854, which can also include a wireless access point (AP) disposed thereon for communicating with the adapter 858 in a wireless mode.

When used in a WAN networking environment, the computer 802 can include a modem 860 or can be connected to a communications server on the WAN 856 via other means for establishing communications over the WAN 856, such as by way of the Internet. The modem 860, which can be internal or external and a wired or wireless device, can be connected to the system bus 808 via the input device interface 844. In a networked environment, program modules depicted relative to the computer 802 or portions thereof, can be stored in the remote memory/storage device 852. It will be appreciated that the network connections shown are examples, and other means of establishing a communications link between the computers can be used.

When used in either a LAN or WAN networking environment, the computer 802 can access cloud storage systems or other network-based storage systems in addition to, or in place of, external storage devices 816 as described above. Generally, a connection between the computer 802 and a cloud storage system can be established over a LAN 854 or WAN 856 e.g., by the adapter 858 or modem 860, respectively. Upon connecting the computer 802 to an associated cloud storage system, the external storage interface 826 can, with the aid of the adapter 858 and/or modem 860, manage storage provided by the cloud storage system as it would other types of external storage. For instance, the external storage interface 826 can be configured to provide access to cloud storage sources as if those sources were physically connected to the computer 802.

The computer 802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
at least one processor; and
at least one memory coupled to the at least one processor, comprising instructions that cause the at least one processor to perform operations comprising:
determining a priority order of storage devices for installation of an operating system on targeted storage as part of implementing a zero-touch protocol for installation of the operating system on a group of servers, wherein the determining is performed independently of determining respective groups of storage devices accessible by respective servers of the group of servers, and wherein the priority order differs from respective data transfer rates of the storage devices;
communicating with a target server of the group of servers to determine the group of storage devices accessible by the target server;
identifying a storage device of the group of storage devices that has a highest priority for operating system installation;
determining a unique identifier of the storage device; and
installing the operating system on the storage device using the unique identifier.

2. The system of claim 1, wherein the storage device comprises host bus adapter storage, and wherein the unique identifier of the storage device comprises a combination of a serial-attached small computer system interface address and a target number.

3. The system of claim 1, wherein the storage device comprises a redundant array of independent storage, and wherein the unique identifier of the storage device comprises a combination of a serial-attached small computer system interface address and a target number.

4. The system of claim 1, wherein the storage device comprises non-volatile memory express storage, and wherein the unique identifier of the storage device comprises a serial number of the storage device.

5. The system of claim 1, wherein the storage device comprises flash storage coupled to a peripheral component interconnect express card with hardware redundant array of inexpensive disks storage, and wherein the unique identifier of the storage device comprises a name or type of a disk of the storage device.

6. The system of claim 1, wherein the storage device comprises secure digital-based storage, and wherein the unique identifier of the storage device comprises a device type of the storage device.

7. The system of claim 1, wherein storage devices of the group of storage devices are determined in an order, and wherein the storage device differs from a first-identified storage device in the order as seen by the operating system during installation.

8. A method, comprising:
   determining, by a system comprising a processor, a priority order of storage devices for installing an operating system on a computing device of a group of computing devices, wherein the determining is performed independently of determining respective groups of storage devices accessible by respective computing devices of the group of computing;
   determining, by the system, a group of storage devices available to the computing device;
   identifying, by the system, a storage device of the group of storage devices that has a highest priority of the priority order for operating system installation, wherein the priority order is specified independently of respective data transfer rates of the storage devices;
   determining, by the system, a unique identifier of the storage device; and
   installing, by the system, the operating system on the storage device using the unique identifier.

9. The method of claim 8, wherein the priority order is maintained externally from the computing device, and wherein respective operating system installation for respective computing devices of the group of computing devices is performed based on the priority order.

10. The method of claim 8, wherein a first portion of the group of storage devices is dedicated for operating system installation, and wherein a second portion of the group of storage devices is dedicated for infrastructure to maintain another storage configuration.

11. The method of claim 8, wherein the group of storage drives omits a top priority type of storage identified by the priority order of storage devices, and wherein the storage device corresponds to a second priority type of storage identified by the priority order of storage devices.

12. The method of claim 8, wherein determining the group of storage devices available to the computing device comprises:
   communicating with a baseboard management controller of the computing device.

13. The method of claim 8, wherein the unique identifier of the storage device comprises an identifier used by the operating system to identify the storage device.

14. The method of claim 8, wherein the priority order of storage devices prioritizes storage devices with better performance for non-operating system data as determined according to a performance criterion.

15. A non-transitory computer-readable medium comprising instructions that, in response to execution, cause a system comprising a processor to perform operations, comprising:
   determining a priority order of storage devices usable to install an operating system on a computing device of a group of computing devices, wherein the determining is performed independently of determining respective groups of storage devices accessible by respective computing devices of the group of computing, and wherein the priority order differs from an ordering of the storage devices based on respective data transfer rates of the storage devices;
   identifying a storage device of a group of storage devices possessed by the computing device that has a highest priority for operating system installation;
   determining a unique identifier of the storage device; and
   installing the operating system on the storage device using the unique identifier.

16. The non-transitory computer-readable medium of claim 15, wherein the computing device is a first computing device, wherein the operating system is installed on a second storage device of a second computing device of the group of computing devices, and wherein the storage device is of a different storage type than the second storage device.

17. The non-transitory computer-readable medium of claim 15, wherein a first portion of the group of storage devices is designated for operating system installation in accordance with the priority order, and wherein a second portion of the group of storage devices is configured as part of another storage configuration.

18. The non-transitory computer-readable medium of claim 15, wherein the storage device comprises non-volatile memory express storage.

19. The non-transitory computer-readable medium of claim 15, wherein the storage device comprises secure digital-based storage, host bus adapter storage, a redundant array of independent drives storage, or flash storage coupled to a peripheral component interconnect express card with hardware redundant array of inexpensive disks storage.

20. The non-transitory computer-readable medium of claim 15, respective computing devices of the group of computing devices are distributed geographically, wherein respective computing devices of the group of computing devices have respective different storage configurations, and wherein respective operating system installations on the respective computing devices are performed according to the priority order.

* * * * *